(12) United States Patent
Varadarajan et al.

(10) Patent No.: US 9,477,281 B2
(45) Date of Patent: Oct. 25, 2016

(54) DISTRIBUTED INFORMATION TECHNOLOGY INFRASTRUCTURE DYNAMIC POLICY DRIVEN PEAK POWER MANAGEMENT SYSTEM

(71) Applicants: Srinivas Varadarajan, Mysore (IN); Srivatsa Krishnaswamy, Bangalore (IN); Sanjaya Ganesh Hariharan, Bangalore (IN)

(72) Inventors: Srinivas Varadarajan, Mysore (IN); Srivatsa Krishnaswamy, Bangalore (IN); Sanjaya Ganesh Hariharan, Bangalore (IN)

(73) Assignee: Vigyanlabs Inc., Manhattan Beach, CA (US)

( * ) Notice: Subject to any disclaimer, the term of this patent is extended or adjusted under 35 U.S.C. 154(b) by 116 days.

(21) Appl. No.: 14/526,267

(22) Filed: Oct. 28, 2014

(65) Prior Publication Data

US 2016/0077570 A1 Mar. 17, 2016

(30) Foreign Application Priority Data

Sep. 12, 2014 (IN) .......................... 0933/KOL/2014

(51) Int. Cl.
| | |
|---|---|
| *G06F 1/32* | (2006.01) |
| *G06F 1/12* | (2006.01) |
| *G06F 1/26* | (2006.01) |
| *H04L 12/10* | (2006.01) |
| *H02J 9/00* | (2006.01) |

(52) U.S. Cl.
CPC ................ *G06F 1/26* (2013.01); *H02J 9/002* (2013.01); *H04L 12/10* (2013.01); *G06F 1/32* (2013.01)

(58) Field of Classification Search
CPC .................................... G06F 1/32; G06F 1/26
See application file for complete search history.

(56) References Cited

U.S. PATENT DOCUMENTS

| | | | |
|---|---|---|---|
| 8,069,359 B2 | 11/2011 | Tolentino | |
| 8,145,918 B2 | 3/2012 | Borghetti et al. | |
| 8,201,007 B2 | 6/2012 | Varadarajan | |
| 2002/0178387 A1* | 11/2002 | Theron | G06F 1/32 713/300 |
| 2004/0103329 A1* | 5/2004 | Morisawa | G06F 1/263 713/300 |
| 2010/0017045 A1* | 1/2010 | Nesler | B60L 11/1824 700/296 |
| 2010/0058093 A1 | 3/2010 | Danieli et al. | |
| 2010/0229014 A1 | 9/2010 | Blackburn et al. | |

* cited by examiner

*Primary Examiner* — Phil Nguyen
(74) *Attorney, Agent, or Firm* — Rahman LLC

(57) ABSTRACT

A peak power management system for networked smart IT devices. These smart devices have computing capability with at least one CPU and memory and can be networked. An uninterruptible power supply provides power to the smart devices. A central intelligent power management server controls the power consumed by all the smart devices networked with the server. The system uses priority based peak power management policies for smart IT devices assisted by fine grain control of external power drawn by each device. By applying different power management policies at different scheduled intervals and controlling the power consumption on the smart devices, the aggregated peak power demand is controlled. The policies can be adapted in-time to suit the actual, real-time power requirement of devices, their priorities, and applicable peak power limit at that time. Also, dynamic policy based peak power management can be extended to an intelligent hierarchical power distribution network.

21 Claims, 8 Drawing Sheets

DISTRIBUTED INFORMATION TECHNOLOGY INFRASTRUCTURE DYNAMIC POLICY DRIVEN PEAK POWER MANAGEMENT SYSTEM

CROSS-REFERENCE TO RELATED APPLICATION

This application claims priority to Indian Patent Application No. 0933/KOL/2014, filed on Sep. 12, 2014, and entitled, "DISTRIBUTED INFORMATION TECHNOLOGY INFRASTRUCTURE DYNAMIC POLICY DRIVEN PEAK POWER MANAGEMENT SYSTEM," the complete disclosure of which, in its entirety, is herein incorporated by reference.

BACKGROUND

1. Technical Field

The embodiments herein generally relate to power management of electronic devices, and more particularly to fine grain power management of distributed information technology (IT) infrastructure components.

2. Description of the Related Art

All over the world the demand for energy is constantly increasing. From both an environmental point of view and the existing capacity available, power supply companies are forced to impose schedule based restrictions on usage of power by different industries. As an example, an IT company may not be allowed to draw more than 'X' KVA of power during the specified intervals during days of the week. Curbing the peak demand helps both power supply companies and the consumer companies. In the case of consumers, the fixed charges on peak demand comes down, and stored power on UPS and batteries is better used leading to reduced operational costs.

For power supply companies, by evenly distributing power to different users at all times, their capacity utilization is optimal and there are no unexpected outages leading to disastrous results for the companies and economy as a whole. Adding additional capacity is very expensive and comes with collateral environment damages. The term 'Intelligent Power Management' refers to intelligently managing the power consumed by a plurality of managed smart IT devices at any time with the objective of optimizing the average and peak power consumed by the devices.

Some of the conventional techniques related to power management of electronic devices include U.S. Pat. Nos. 8,201,007 and 7,188,264 and U.S. Patent Application Publication Nos. 20100262312 and 20100262312, the complete disclosures of which, in their entireties, are herein incorporated by reference. The '264 patent comprises a server and a plurality of client computers connected to the server via a network, wherein the server defines groups among the client computers and determines the power source information and the power shift time period for each group. The power source can be the primary external main or the secondary source such as the local battery. The power shift time period for each of the client computer groups is based on power load information for the external power source sent by the power company. The server can also define the battery power level below which the battery in a client computer can start charging from the external main power.

The '312 patent application describes an electric power storage and a power control system that may be adapted to a home electric storage apparatus. The use of renewable energy has been actively researched and developed in order to break from dependency on fossil fuels. In the case where the renewable energy is used, there are problems in that the amount of power generation varies with natural conditions and in that deficiency and excess occur with respect to power consumption.

SUMMARY

In view of the foregoing, an embodiment herein provides a peak power management system comprising at least one computing device comprising a central processing unit (CPU); a main memory component accessed by the CPU; a persistent storage connected to the memory component and accessed by the CPU; a communication component for connecting to a communication network; and an operating system controlling the at least one computing device and operated by the CPU. The system further comprises a power management server comprising a cluster of computers running operating systems; a set of virtual machines running on the cluster of computers; one or more communication components for connecting to a communication network; a persistent storage for storing any of software programs, applications, and data, wherein the power management server runs a set of software applications comprising a power management program. The communication network that connects the power management server and the at least one computing device for exchanging messages between them, wherein the power management system draws its electrical power for all the at least one computing device and the power management server from an uninterrupted power supply (UPS), wherein the UPS draws power from any of an external power supply source and a captive electrical power generator, wherein the power supply source is configured to impose a temporal peak power profile (TPPP) comprising a time schedule based limits on the amount of peak power that can be drawn by an entity under consideration during various time periods in a year, wherein the data in the form of the TPPP is stored in the power management server persistently, wherein the UPS comprises a built-in computing device and is configured to receive commands from the power management program and send responses to the power management program in addition to sending unsolicited messages to the power management program, wherein each the at least one computing device runs a program comprising an intelligent power management agent all the time independent of whether the agent comprises a connected mode and disconnected mode respectively in order to communicate with the power management program, wherein the power management program communicates with the agent on all the at least one computing device to send commands and receive responses or receive data from the agents in an unsolicited and time schedule based manner, wherein the agent controls a peak power consumption based on an ability to control power consumption of the at least one computing device with minimal impact on a performance of the at least one computing device, and wherein the agent continues to control power consumption even when the agent is operating in a disconnected mode and is not communicating with the power management program.

Each the at least one computing device may be assigned any of an operational priority and a rank in the range of 1 to 10 indicating a level of importance for the at least one computing device with number 1 being a highest priority and number 10 being a lowest priority, and wherein a first device of higher priority is entitled to a higher external peak power limit than a second device of lower priority, and wherein the peak power limit ranges from a percentage range of 100% to 0% of external power drawn from the UPS. A percentage of peak power for a particular device comprises the percentage of a peak power demand that the particular device can make under unrestricted conditions, wherein all devices of a particular priority are entitled to a same peak power limit at any point of time. The peak power management system may further comprise a limited number of minimum peak power allowed (MINPP) data sets corresponding to a peak power limit allowed by a percentage of a set of member devices, wherein a number of the MINPP data sets is equal to a number of priorities plus one. The particular device at any point of time is assigned to be in one of the MINPP data sets by the power management program, wherein an assignment to the MINPP data sets is configured to be changed by the power management program only, and wherein the assignment is restricted by the TPPP.

The power management program in the power management server is configured to create a device peak power management policy (DPPP) for each the at least one computing device based on a priority of the at least one computing device, wherein the DPPP comprises an entitlement or allocation of the peak power limit for the at least one computing device at any particular point of time such that a total peak power allocated for all devices does not exceed the peak power limit imposed by the external power supply source as expressed in TPPP at any time.

The peak power management system may further comprise at least one peak power assignment functions (PPAF) based on the TPPP and operational priorities of all the at least one computing device. The power management program in the power management server sends each DPPP to a corresponding device such that the agent running on the at least one computing device is configured to use the DPPP as a guide to control power consumption at any point of time even while the agent is operating in a disconnected mode.

The peak power management system may further comprise an enhanced PPAF that further optimizes peak power allocation dynamically by considering an actual number of devices that are on and are consuming power; reviewing a peak power allocation to devices; calculating a peak power available as a difference between an allocated enterprise peak power (EPP) limit and actually used peak power as measured from the UPS at an end of each review period or cycle; ensuring that when the available peak power is >0 then at every review cycle the peak power limit is increased for devices that are entitled for more allocation up from an actual current allocation for a given device, wherein an increased allocation starts with least peak power allocated devices in a descending order of the operational priority of a selected device such that higher priority devices are allocated first among a set of least power allocated devices; and ensuring that when the available peak power is <0 such that more power is actually being consumed than the allowed EPP level at that time, then at every review cycle, the peak power limit is decreased for devices from the actual current allocation, wherein a decrease in allocation starts with least peak power allocated devices and among them in an ascending order of operational priority such that a decrease occurs from a lowest priority device to a highest priority device within the MINPP set of devices having a same current peak power allocation.

The power management server and all controlled devices have their system clocks synchronized in time using a network time protocol (NTP) thereby ensuring that all devices will look at UPS power supply sinusoidal waves synchronously. In a one second interval, for a 50 Hertz frequency, a complete set of sinusoidal waves cycles are configured to be numbered from 1 to 50 and are seen in a same way by all devices at any time, wherein drawing external power supply from the UPS during all 50 cycles means 100% main peak power allocation and drawing power during only 5 contiguous cycles means 10% peak power allocation.

An assignment of a set of contiguous sinusoidal cycles to any device is computed by the power management program based on the DPPP for that device and an overall boundary condition that the EPP is never exceeded at any time by a total allocation for all devices, wherein a random assignment of cycles to all devices is configured to achieve a statistically uniform distribution of power that is limited by the EPP over any given time schedule, and wherein the random assignment of cycles to devices is configured to avoid unexpected total peak power demand exceeding the EPP and is configured to make the total peak power demand flat during a time schedule during which the EPP is applicable.

The DPPP comprises several time schedules with each schedule indicating a peak power allocated, a starting sinusoidal wave cycle number, and an ending cycle number for drawing external power from the UPS by a power supply unit of the particular device. The agent invokes programming calls with start and end cycle numbers as input parameters to a power supply programming interface at any of a beginning of each schedule and whenever a new DPPP is sent from the power management program on the server to the at least one computing device, wherein a power supply connects to an external power source only during the cycles to the external power supply and is configured to store power or charge in order to supply an average power to all the internal device components, wherein selective connectivity is achieved by using a digital switching gate to an external source which opens and closes based on contents of a digital counter, and wherein external power charges local batteries on the at least one computing device so that power is supplied continuously to the at least one computing device internally from the local batteries.

The power management program collects all power consumption data from the at least one device through the agents and maintains a history database of such data persistently, wherein the peak power management system is configured to allow specific requests for power allocation during specific intervals of any day of a year for specific devices, wherein based on historical data and specific requests, the power management program is able to statistically predict required maximum peak power allocations for any of the at least one computing device for different time intervals of each day and accordingly assign the particular device to a corresponding set MINPP for each such interval.

At a beginning of each day, DPPPs are created and sent to the at least one computing device, wherein the DPPPs are configured to be revised periodically during the day with a period equal to a reassignment review interval in order to adjust to real-time peak power demands coming from many devices, wherein the devices that are operating within a predetermined percentage of the allowed peak power in a review interval are configured to send a request to the power management program to allocate more power, and wherein the power management program collects all requests and adaptively reallocates peak power to a subset of requesting devices in order to satisfy the requests whenever feasible.

An increased allocation to the requesting devices removes excess allocation from other devices which are utilizing additional peak power than a minimum peak power limit that they are entitled to. The at least one computing device comprises an information technology enabled device. The at least one computing device comprises a display device operatively connected to the CPU. The at least one computing device comprises a power backup storage battery used by the at least one computing device. The peak power management system is configured in a hierarchical power distribution network system comprising at least one the peak power management system representing an enterprise consumer; and a hierarchy network of intelligent power distribution nodes belonging to a power supply company starting with a root level main distribution node, wherein an enterprise is viewed as an intelligent device making variable peak power demand by its parent node, wherein each power distribution node is adapted to be dynamic policy driven, peak power management of its child-level nodes, and wherein each node makes best of use of its allocated peak power during any interval of time and allocates to its child-level nodes using peak power management methods.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
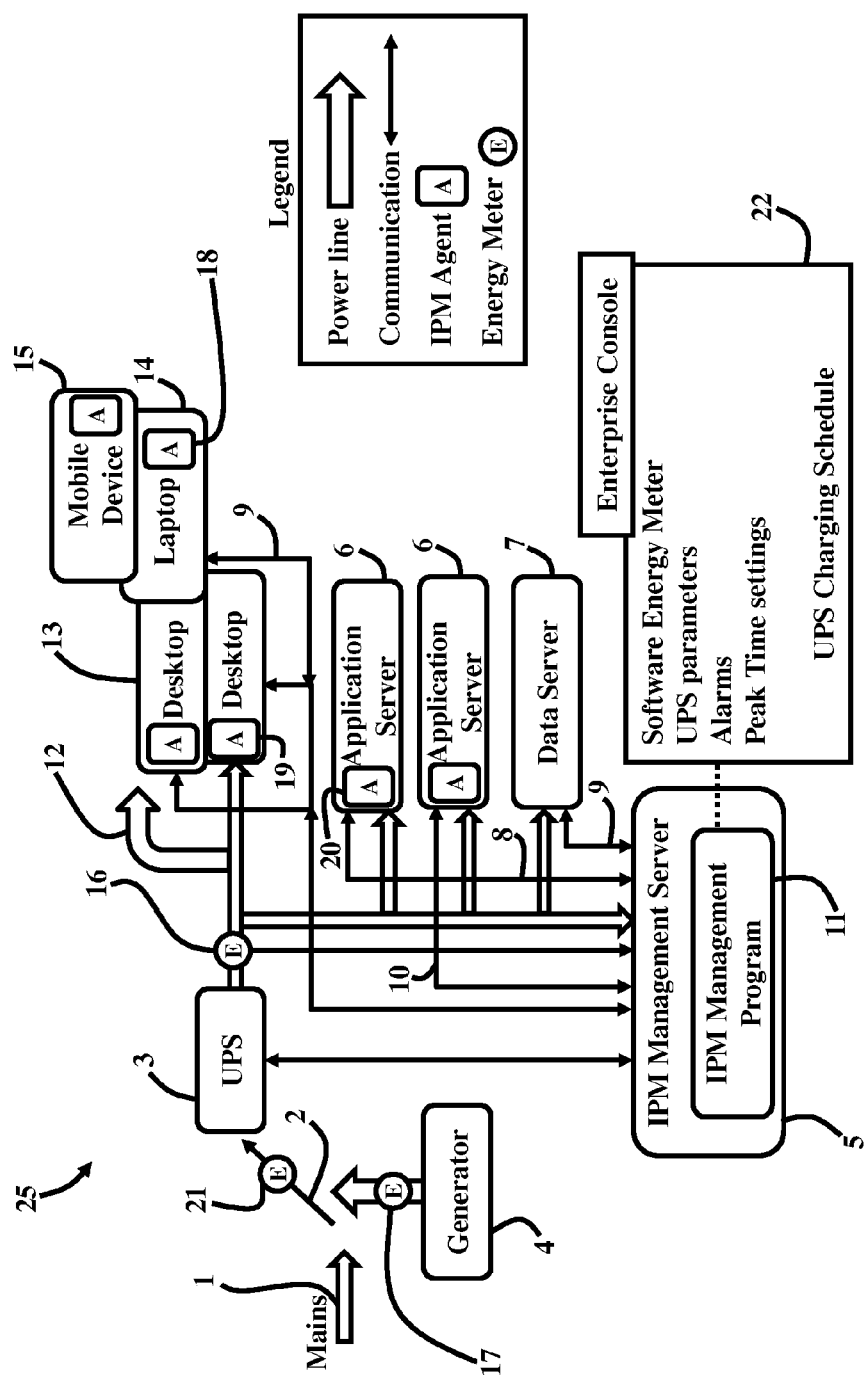
FIG. 1 illustrates a schematic diagram of a system according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a technique for power consumption in a plurality of smart IT devices connected to a network can be controlled intelligently by using a system consisting of several software components or modules. The software components run on a server as well as the devices. The embodiments herein use priority based peak power management policies for smart IT devices assisted by fine grain control of external power drawn by each device. This approach uses an intelligent agent in each device as described in the '007 patent. The agent on the device is smart enough to regulate the power consumption in each device and also save power to be within the imposed peak power limit. This is performed without affecting the performance of each device as explained in the '007 patent. Additionally, a dynamic optimization is achieved at the enterprise level by maximally consuming available power thus ensuring best performance of all devices and avoiding unnecessary starvation of power. Moreover, the system uses its historical knowledge of actual power consumption reported by all devices to smartly allocate peak power to various devices. As time progresses the system adaptively reallocates based on the priority based policies and the real time need for power. Referring now to the drawings, and more particularly to FIGS. 1 through 8, where similar reference characters denote corresponding features consistently throughout the figures, there are shown preferred embodiments.

Below are some definitions as used in accordance with the description herein, "IT" refers to information technology as is commonly and well known. "IPM System" refers to the collection of all the software components for an intelligent power management system. "Smart IT Devices" refers to components including, but not limited to desktops, laptops, servers, network devices, mobile devices, storage devices, printers, UPS, intelligent TV, and any device with a computing capability that is addressable in a network. These devices are able to understand any command sent from a central management server and can send responses, send unsolicited events to the central management server. As commonly understood, each such smart device has at least one CPU, main memory accessed by CPU, a persistent storage, and an optional display. As used herein, the terms 'smart device' and 'device' refer to a 'smart IT device'.

"IPM Agent" refers to an IPM system software component that runs in the background on IT devices such as discussed. "IPM Management Server" refers to a cluster of physical servers or virtual machines (VMs). Here, VM refers to a commonly understood term in the IT industry. "IPM Management Program" refers to the 'management software' that runs on an IPM Management Server. "IPM Enterprise Console (EC)" refers to the administrator console for the management personnel of an IPM system server. The 'home' screen in EC is also called a dashboard. "Device Peak Load" refers to the peak power that a device draws from UPS during any interval of time. "Periodic Reassignment Review Interval" refers to a periodic interval for observation of actual peak power consumed by the enterprise and subsequent reassignment of different peak power limits to a subset of devices if there is a scope.

"Device Peak Power Control Policy (DPPP)" refers to the device specific peak power control policy computed by the IPM Management Program that is sent to the device. The policy comprises many time interval specifications and for each such interval how much of device's peak power can be drawn by the device from the main power supplied by UPS. "Temporal Peak Power Profile (TPPP)" refers to the allowed peak power against time at the organization (or Enterprise) level and is expressed as percentages of the maximum allowed peak power for the organization during different time intervals of any day in a year. This is decided by the external power supply company. This data is stored and used by the IPM Management Program and exceeding the limit at any time by the enterprise attracts a severe penalty.

An IPM system 25 is shown in FIG. 1. The main power supply 1 and the in-house, captive electric power generator 4 can be connected as power input to the uninterrupted power supply (UPS) 3 through a bi-polar switch 2. When the main power 1 is not available, then the generator 4 is automatically used through the switch 2. From UPS 3 all the smart devices such as servers, desktops, laptops 13, 14, 15 get their power through the power line 12. The IPM management server 5 runs the IPM management program 11. The IPM management program 11 intelligently manages power consumption of the plurality of smart devices 13, 14, 15 and provides data to the enterprise console 22. Examples of smart devices are: (A) a plurality of application servers 6 and data servers 7 that are typical heavy duty IT servers used in an enterprise. There can be any number of such servers in an enterprise as part of their IT infrastructure. (B) a plurality of personal computers in the form of desktops 13, laptops 14, and other mobile devices 15. The servers 6, 7 are networked with the IPM management server 5. The logical connections or communication paths between any programs running on servers 6, 7 and the IPM management program 11 on the management server 5 are also shown as connections/paths 8, 9, 10. A logical connection occurs over the underlying physical network such as a Local Area Network. Similarly, desktops 13, laptops 14, and mobile devices 15 are networked with the IPM management server 5. (C) UPS 3 and a plurality of energy meters 16, 17, 21. The energy meters 16, 17, 21 are also networked with IPM management server 5 and can send data or receive commands from the IPM management program 11.

Figure 2:
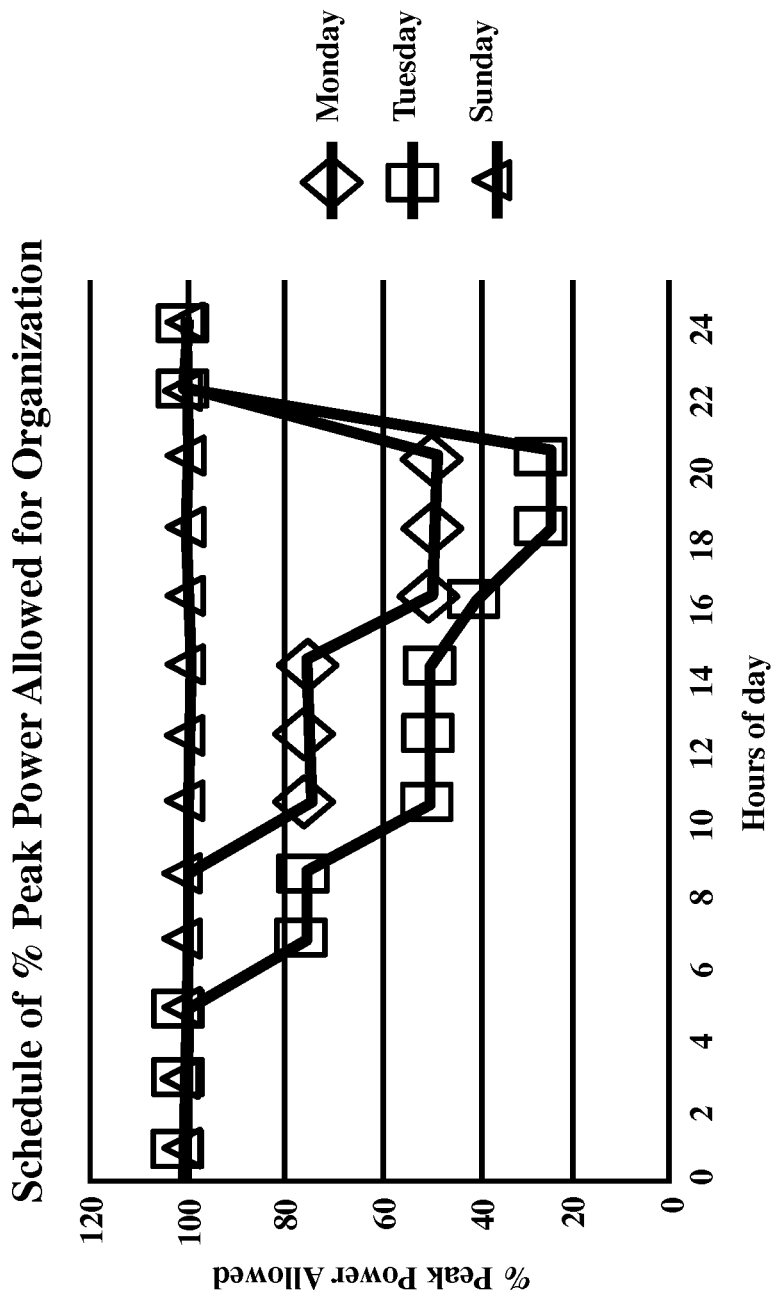
FIG. 2 is a graphical illustration of the allowed peak power profile for an enterprise during different intervals of day (TOD) and days of week according to an embodiment herein.

The management of the smart devices as described above by the IPM management program 11 can be in two modes: (i) communicating with an intelligent IPM agent 18, 19, 20 running on the smart devices; or (ii) agentless control where there is no need for an IPM agent 18, 19, 20 to be running on the smart devices 13, 14, 15. IPM management program 11 sends commands and receives data to the devices through 'proxy agents' that are software components running on the server 5 itself. A smart device 13, 14, 15 can send data to the IPM management program 11 on its own in the form of unsolicited events. FIG. 2 is a graphical illustration of the allowed peak power profile for an enterprise during different intervals of day (TOD) and days of week according to an embodiment herein.

The term peak power refers to the peak power demand during a specified interval. For example, an IT company may make a peak demand of 300 Kilo Volt Amperes (KVA) during the entire year. When all the employees come to work and boot their systems at the same time, the power surge required will be much more than the steady-state or average power consumption of the same devices. Hence, the peak power demand will be a few times the average power required. Here are some situations where peak power management is essential: (i) The power demand is seasonal and generally demand is more than power supply. (ii) There may be peak load limitation during some seasons or some hours of the day. Severe penalties will be imposed by the power supply company on the enterprise if the limit is exceeded. (iii) the peak demand is always charged separately from actual usage. (iv) there are multiple billing rate slabs based on actual consumption. (v) the main power 1 itself may go off in which case the IPM server 5 becomes imperative to avoid loss of data as it can ensure that UPS power is used effectively by starving power for low priority devices or if necessary shutting them down without loss of data.

Regarding intelligent power management in smart devices, the '007 patent describes how power dissipation can be saved in each smart device by fine grain control of parameters of major resources such as the CPU, hard disk, display, and network ports on a smart device. The 'main power' to any device may refer to the power coming from the UPS 3 output as illustrated in FIG. 1. The UPS output power itself is a fraction of its input main power (in KVA) coming from the power supply company. One can also measure UPS output power in watts or kilo watts.

A smart device 13, 14, 15 can optionally have a battery (not shown) to provide local power backup. Laptops 14 and mobile devices 15 have a local battery which gives power even if the main power supply (from UPS 3) is not available. Here, the main power supply can be controlled in the following ways: (a) Stop main power as per a schedule. Let the device draw power from its battery as described in the '264 patent. An example would be: during 10 am-12 am, Monday-Friday no main power is drawn by the device. (b) Do not draw power from mains unless battery charge falls below 'X %' of its capacity as described in the '264 patent. (c) Allow main power but reduce consumption by the device by applying power saving policies as described in the '007 patent. The device is directed to operate at 100%, 75%, 50%, 25% or 1% or 0% (sleep) of its capacity in a given period. This saves the power consumption significantly. A combination of (a) to (c) above can be used to save power consumption and also to control peak power.

Figure 4:
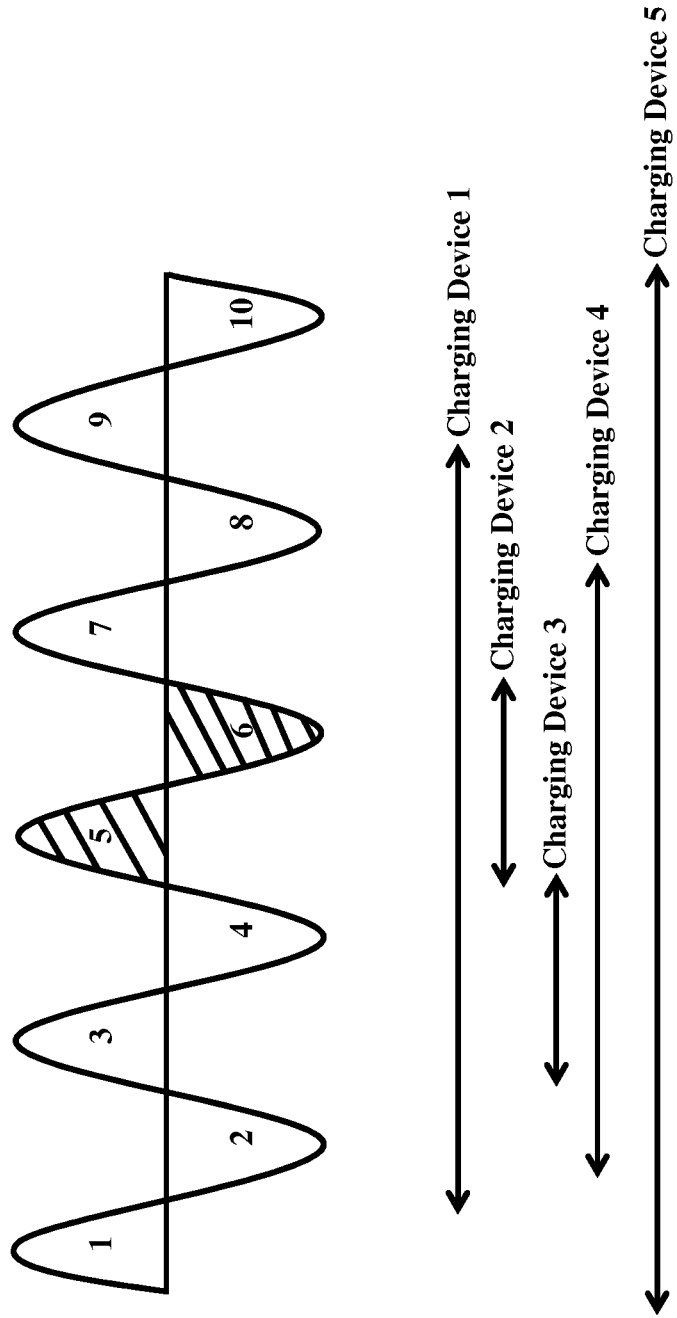
FIG. 4 is a graphical illustration describing charging devices during different cycles according to an embodiment herein.

Servers, desktops, and printers do not have a local battery and hence need the main power (from UPS 3) all the time. Even such devices do not need power from the main supply during every sine-wave cycle. Usually the power supplies convert the AC power to DC and then have capacitors to save the charge. The amount of charge periodically deposited on capacitors determines the average output current. A device power supply can connect the mains periodically to charge the capacitors during a few contiguous sine-wave cycles. As indicated in FIG. 4, assuming a frequency of 50 cycles, during a 1 second interval for a 50 Hertz power supply, a device can charge during all 50 cycles for 100% power or 25 contiguous cycles for 50% power and so on. For example every 1 second, the power supply can charge on the beginning of $7^{th}$ sine wave and turn-off after $16^{th}$ cycle. Thus, by controlling the subset of power supply cycles that are contiguous, one can control the amount of power that is consumed at a device level. A system for implementing this concept is explained below with reference to FIG. 5.

Main power from UPS 401 is available to any device 400. The power sine waves also trigger the digital counter 405 once in every cycle. The counter 405 resets after every 1 second interval. The outputs of the counter 405 are decoded using decoders 404 and are used to turn-on or turn-off the digital switch 402 through which main power 407 becomes available to the device's power supply 403. The decoders 404 are programmed dynamically according on the peak power management policy for the device 400 sent from the server (not shown in FIG. 5). For example, the switch 402 can be on at the beginning of $5^{th}$ cycle and turn-off at the beginning of $10^{th}$ cycle. The power supply unit 403 of the device 400 charges the local battery 406 whenever the external main power is available and also draws power from the main 401. When the digital switch 402 is off, then the battery 406 becomes the only source of power for the power supply 403. Usually a device's power supply will charge an internal bank of large capacitors whenever power is available. This happens even before batteries are charged. This stored energy in capacitors (not shown) will be also help supply power to the device in the absence of external power.

From the central IPM management program 11 (e.g., of FIGS. 1 and 3), policies can be sent to different devices 13, 14, 15. These policies can be predetermined by design. Applying a policy to a device guarantees that the device load does not go beyond the specified limit. The IPM agent 15, 19, 20 on the device will monitor frequently and ensure this.

Figure 3:
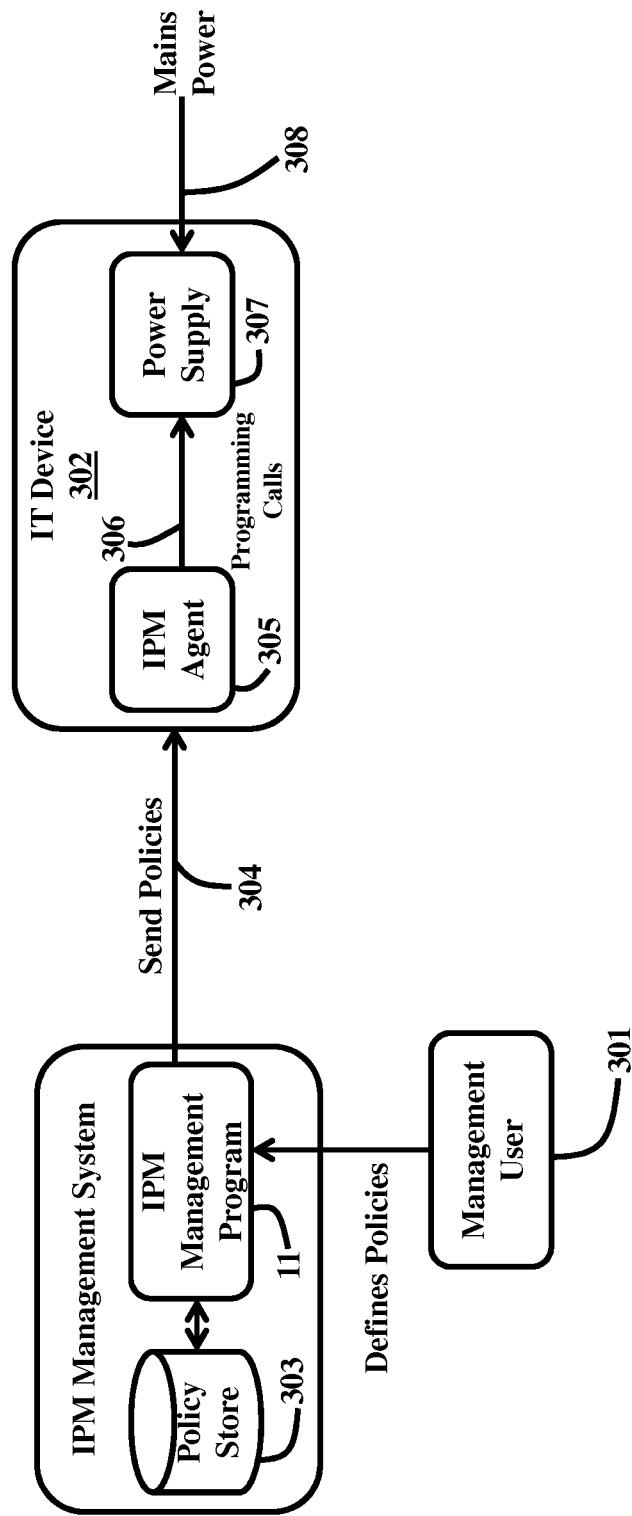
FIG. 3 illustrates a schematic diagram of a control system according to an embodiment herein.

With reference to FIG. 3, a management user 301 or administrator defines the peak power control policies by interfacing to the IPM management program 11. The policies are stored in a persistent policy store 303. Later, the management program 11 sends applicable policies 304 down to the corresponding device after connecting with the IPM agent 305 on the device 302. The IPM agent 305, upon receipt of these policies, stores them persistently locally and makes programming calls 306 to the power supply interface 307. The device 302 will start drawing the main power from the UPS 308 as per a policy at any time.

In terms of designing device specific policies for controlling the peak load, assume we have set of devices $\{D_i\}$, i=1 to N. Let EPPmax be the maximum allowed peak power for the enterprise when there is no restriction. The allowed peak power during any scheduled interval t1-t2 will be percentage of EPPmax for the entire enterprise.

EXAMPLE

EPP which is Peak Power Allowed during 1 pm-3 pm on Mondays=0.5*EPPmax.

Let us take 3 such fractions EPP1=0.75*EPPmax, EPP2=0.5*EPPmax, EPP3=0.25*EPPmax.

For a policy for some device $D_i$, we can define the allowed maximum peak power load that $D_i$ can create whenever the enterprise is only allowed to create a peak load that is only a fraction of EPPmax.

EXAMPLE

When EPP4=0.3*EPPmax, some device $D_i$ can only draw 30% of its peak power from UPS. If the device $D_i$ creates a peak power load of 300 watts when there is no restriction (at EPPmax) then the same device is allowed to draw a peak power of 0.3*300=90 watts only when the organization peak power is restricted to EPP4.

For any other non-explicitly specified fraction of EPPmax say EPPn (e.g. EPPn=0.4*EPPmax), we can use a linear interpolation technique using the data points at EPP1, EPP2 etc. as described above to determine how much peak load a device can create.

Now let us define a function that determines the allowed peak power consumption by various devices that are part of the IT infrastructure.

Given, for any time interval t1-t2, and
a) Peak Power allowed for the Enterprise EPP during the interval, and
b) For all I∈1 . . . N, we have, for $i^{th}$ device $D_i$, the tuple $\{D_i, DPP_i, Dprio_1\}$. Here $DPP_i$ is the Rated Full Peak Power of the $i^{th}$ device and $Dprio_i$ is the assigned operating priority for the $i^{th}$ device. A higher priority device can be kept running at the cost of lower priority devices and also its peak power allocation can be higher anytime if necessary.

Let there be "Minimum Allowed Peak Power sets" $MINPP_j$, j∈1 . . . M. Each set defines a worst case minimum allowed peak power for all the devices that are in the set, even when there is a cut on Enterprise peak power (EPP), subject to the aggregated enterprise peak power never exceeding EPP at any point of time.

For example, in an enterprise we can have a heavy duty server which always has to perform at all times and so we can specify that, subject to overall enterprise peak power constraints over time, we allow the server's peak load to be not less than 80% of its maximum peak load. So even when the peak power limit is set at 50% of maximum for the enterprise, we still want the server to go on at 80% of its capacity. Obviously some less important devices like desktops 13 will have to starve to make up for the server's load. This is the idea behind creating $MINPP_j$ classification. However, if the peak power limit puts a high restriction and makes it infeasible to allocate 80% peak power to the server then all devices will have to scale down accordingly in their peak demand. We may end up with the server in question actually consuming a maximum of 50% of its peak power demand.

Table 1 defines the MINPP classification with number of sets M=11.

TABLE 1

Minimum Peak Power Allocation subsets

| Set No (1 to M) | Minimum Allowed Peak Power for any device in the set |
|---|---|
| 1 | 100% |
| 2 | 90% |
| 3 | 80% |
| 4 | 70% |
| 5 | 60% |
| 6 | 50% |
| 7 | 40% |
| 8 | 30% |
| 9 | 20% |
| 10 | 10% |
| 11 | 0% |

Here, the minimum allowed peak power for a device which is a member of some $MINPP_j$ is expressed as a percentage of that device's maximum peak power ever. Example: Given a time interval 10 am-12 noon, suppose a server that needs 300 Watts peak power is a member of set $MINPP_3$ then it means that the server is allowed to consume 80%*300 watts from its main power source. Similarly, a laptop 14 can be a member of $MINPP_{11}$ and it need not load the mains at all. It can operate using its battery charge.

Now the problem we are solving is to create a peak power assignment function (PPAF) that assigns devices to MINPP sets. Its mapping is given below.

PPAF (EPP, $\{D_i, DPP_i, DPrio_i\}$:i∈1 to N)→$MINPP_j$ where j∈1 . . . M and $MINPP_j$ contains $\{D_k\}$:k∈1 . . . N and $\{D_k\} \subseteq \{D_i\}$:i∈1 . . . N, i.e. $\{D_k\}$ is a subset of all devices $\{D_i\}$ This is explained as follows:
The inputs to the assignment function PPAF are the EPP, the set of all devices with device specific parameters and the output is a set of minimum peak power sets $MINPP_j$. Each set $MINPP_j$ contains $\{D_k\}$:k∈1 . . . N, i.e. a subset of the all devices set $\{D_i\}$:i∈1 . . . N. The device specific parameters are its Peak Power demand DPP and its operational priority Dprio. Example: There are 10 servers of highest priority (say 1) and 10 servers of priority 2 and 200 desktops of priority 3 and 300 laptops of priority 5. For each device we know the max power required when the device operates at max capacity. All Servers @ 300 watts/server need maximum 6000 watts. All Desktops @ 100 watts/desktop need maximum 20000 watts. All Laptops @ 40 watts/laptop need maximum 12000 watts. Now if we assume that the available peak power is only 20000 watts (at UPS), the problem is how to slot each of these devices keeping their priority in mind so that we can limit peak power requirement to 20000 watts.

One possible solution is: (1) Priority 1 servers can operate at 100% peak needing 3000 watts from UPS. (2) Priority 2 servers can operate at 80% peak needing 2400 watts from UPS. (3) Priority 3 Desktops can operate at 60% peak needing 12000 watts from UPS. (4) Priority 5 laptops can operate at 20% peak needing 2400 watts from UPS. The laptops, though restricted to draw less main power, can actually operate at a high percentage of their capability as long as they consume their local battery power whenever they are starved of main power.

From the above example, it has been shown that the assignment function PPAF is realizable and there can be more than one PPAF solution to achieve the goal of remaining below the peak power limit. An example implementation of PPAF is described later below.

Table 2 shows the policy-message parts that deal with controlling peak power consumption by each device 13, 14, 15. This is sent from the IPM management program 11 to each device 13, 14, 15 the first time and every time the policy changes due to reallocation.

TABLE 2

| Part of the Policy Message that is sent to a device |
|---|
| Device Id |
| Schedule Information 1 |
| Allocated % Peak Power |
| Charging Cycles - from cycle - to cycle |
| ... |
| Schedule Information N |
| Allocated % Peak Power |
| Charging Cycles: from cycle - to cycle |

Multiple solutions exist for the assignment function PPAF. An example of such a solution is as follows:
1. Assume there are N devices; i.e. we have $\{D_i\}$:i∈1 ... N
2. We have priority $DPrio_i$ that a device can take to be from the set $\{1, 2, 3, 4, 5\}$
3. For each device $D_i$ we are given $\{D_i, DPP_i, DPrio_i\}$ where DPP is device 100% peak power load or consumption.
4. We also have the "Minimum Allowed Peak Power sets" $MINPP_j$, j∈1 ... 11 (as shown in Table 1 earlier which has 11 sets}. Assume that $MINPP_j$ are ordered in descending order of peak power consumption; we have $MINPP_1 > MINPP_2 > MINPP_3 > ... MINPP_{11}$.
5. We are given EPP—the peak power that can be drawn from UPS, for the time interval under consideration
6. Initially assign all $\{Di\}$ as follows:
    6.1. All $\{D_i, DPrio_i=1\}$ are assigned to $MINPP_1$
    6.2. All $\{D_i, DPrio_i=2\}$ are assigned to $MINPP_3$
    6.3. All $\{D_i, DPrio_i=3\}$ are assigned to $MINPP_5$
    6.4. All $\{D_i, DPrio_i=4\}$ are assigned to $MINPP_7$
    6.5. All $\{D_i, DPrio_i=5\}$ are assigned to $MINPP_9$
    6.6. Calculate the current peak power requirement "CurPP" under the current assignment. This is straight forward since $DPP_i$ for all devices are known and they have been assigned to several $MINPP_j$.
7. While (CurPP>EPP) // this loop will reduce minimum allowed peak power for devices
    7.1. For all priorities p in $\{5 ... 1\}$ // do it in the reverse order, starting with lowest priority devices
        7.1.1. Shift-right all devices $\{D_i, DPrio_i=5\}$ are currently in some $MINPP_j$ to $MINPP_{j+1}$
        7.1.2. Recalculate CurPP
        7.1.3. If (CurPP<=EPP) break; // we have assigned successfully The IPM agent 18, 19, 20 that runs on the device is responsible for implementing the peak power control policies. It can be performed in the following way:
1) Monitor and control the power consumption of the device as described in the '007 patent as the peak power restriction changes from one period to another.
2) Program the power supply as per the Device Peak Power Control Policy (DPPP) to draw no more than allowed peak power. For example, if the peak current of the device is 1 Amp then under restricted peak power of 0%, stop drawing current from main. If the device can run on battery then make use of that power when mains power is not available or is restricted.
3) Put the device to sleep or hibernate mode if required and schedule the device to wake up at the designated time to change the settings as above.
4) Run local program scripts applicable each time a different Peak Power policy takes effect. For example number of processes/threads of an important application can be increased or decreased, data can be saved, the device can go to standby state etc.

It is also preferred that the power supply 307 on the device 302 that charges the local battery supports an application programming interface (API) to be enabled to draw different amounts of current under different conditions.

As described in the '007 patent, the IPM agent 18, 19, 20 on the device is capable of ensuring that power is not wasted by fine grain control of CPU frequency, display, and other resources on the device. This allows the device to stay below the peak power limit on the device as the agent is constantly monitoring the power consumption.

Second, using network time protocol (NTP), the clocks of all devices on the network can be synchronized. This will ensure that all the devices will look at the same set of power supply sinusoidal waves synchronously. NTP is a standard practice in all enterprise networks.

Third, we can program or instruct a device's power supply to consume some X % of power from mains. Let us assume that lowest allowed value for X is 10 (i.e., 10% as discussed earlier in Table 1). Since all devices 13, 14, 15 are drawing power from the same source (e.g., UPS 3), their power supplies are all synchronized to the power line sinusoidal wave as indicated in FIG. 4. Considering 50 successive cycles of the sine wave of power in a 1 second time interval, a device belonging to $MINPP_1$ can be designed to connect to mains all 50 cycles whereas a $MINPP_{10}$ device can draw main power for a selected bunch of only 5 contiguous cycles during the 1 second interval. Now based on the peak power allocation of all devices the IPM management program 11 can assign different bunches of charging cycles to different devices using a 'uniform statistical distribution function' so that the total peak power for the applicable enterprise EPP is never exceeded during the given interval. Therefore, whenever a peak power control policy (DPPP) is sent to a device 302, the starting charging sine wave number and end wave number are also sent to the device as part of the policy for any time interval. From FIG. 4, it can be seen that there are different devices charging at different times during the pre-specified interval of time. For every 1 second interval, the charging cycles repeat for every device. For example, a hatched cycle in FIG. 4 shows charging for the device 'Device 2'. If a device has to draw main power between 10-20 cycles during 1 pm-3 pm then every second the 10-20 cycles are used for drawing power.

When any electrical gadget or a device is turned on from an off or sleep state, the transient and short term current (and hence corresponding power) required will be higher than the steady state current requirement. This difference becomes even more obvious when one uses intelligent power management on devices that reduces power consumption in steady state as described in the '007 patent. One can design power policies using the central IPM management program 11 such that all devices are not tuned on in one go but they are turned on as per a scheduled sequence. This is especially true for desktops and servers.

EXAMPLE

People come to the office between 9-9:30 am. If we know which desktops need to be turned on before they come, we can start a sequenced power-on for all desktops starting at 8:30 am such that the peak power requirement from the UPS is always kept at a desirable minimum.

An example implementation for assignment function PPAF was discussed above. Different devices $\{D_i, DPP_i, DPrio_i\}$ were assigned to different $MINPP_j$ in order to ensure that enterprise peak power limit EPP was never exceeded at any time. These assignments of devices are static in the sense that the assignments are computed once and applied day-in and day-out as long as the set of devices, their parameters and EPP do not change.

Now consider: the actual number of devices that are ON at any point of time on different days may vary. For example from a maximum of 5000 desktops, actual number desktops that are ON can be 2500, 3500, 1000 etc. on different days at same time say 10 am. The actual total peak power requirement may be significantly less than EPP at any point in time.

Thus, one can further optimize whenever there is a scope for allocating more peak power to unnecessarily peak-power starved devices. It is performed as follows: (1) Set the periodic reassignment review interval to be 30 minutes. (2) Perform a periodic update if there is scope for reassignment. Now the question is what is meant by 'scope for update'. The UPS 3 from which all the main power is drawn by all the devices will have an input side energy meter that is monitored by the IPM central management program 11 as in FIG. 1. If this power reading $Power_{UPS}$ is less than say 90% of EPP during a review interval then there is scope for reassignment. For example, if EPP is 100 KW during a specified time interval say 1-3 pm and $Power_{UPS}$ is less than 90 KW at any time during a review interval of 30 minutes then we can do some reassignment of some devices to higher MINPP sets. This reassignment procedure is given below. Basically it moves the most peak power starved devices to a level higher (upward shift in MINPP sets; i.e. set 11 to set 1). The procedure is as follows:
1. Max_adj_pp=0.9*EPP // Maximum adjustable limit of peak power
2. Let $Power_{UPS}$ be the max UPS input side energy meter reading during a review interval 3. While ($Power_{UPS}$<Max_adj_pp)
   3.1. For all j in {11 ... 2} // do it in the reverse order of $MINPP_{11}$ to $MINPP_1$
      3.1.1. Shift-left all devices with highest priority that are currently in some $MINPP_j$ to $MINPP_{j-1}$
      3.1.2. Wait for $Power_{UPS}$ to stabilize for some time //it could increase
      3.1.3. Measure $Power_{UPS}$ again
      3.1.4. If ($Power_{UPS}$>=Max_adj_pp) break; // we cannot reassign anymore On the other hand, we may be getting beyond permissible limit of Max_adj_pp at the end of a review interval, i.e. $Power_{UPS}$>Max_adj_pp. So we need to move lowest priority devices to right from $MINPP_j$ to $MINPP_{j+1}$ in order to reduce the $Power_{UPS}$. The procedure required is as follows:
4. Max_adj_pp=0.9*EPP // Maximum adjustable limit of peak power
5. Measure $Power_{UPS}$ // $Power_{UPS}$ is the UPS input side energy meter reading
6. While ($Power_{UPS}$>Max_adj_pp)
   6.1. For all j in {10 ... 1} // do it in the reverse order of $MINPP_{11}$ to $MINPP_1$
      6.1.1. Shift-right all devices with lowest priority that are currently in some $MINPP_j$ to $MINPP_{j+1}$
      6.1.2. Wait for $Power_{UPS}$ to stabilize for some time //it could decrease
      6.1.3. Measure $Power_{UPS}$ again
      6.1.4. If ($Power_{UPS}$<=Max_adj_pp) break; // we need not reassign anymore When any device's peak power assignment changes, the IPM management program 11 send this revision of policy to the affected device.

The advantages of dynamic policy based assignment are that it reflects the actual situation and makes full use of the EPP limit, and it results in the best performance for all devices even while limited because of EPP. The dynamic policy based assignment may result in (1) communication or network traffic increases between the IPM server and the devices, and (2) sudden demands for more peak power when there is no headroom left might create power overshoot problems beyond EPP. However the point (2) above can be handled as follows: (a) Disconnect the UPS 3 from its input power (supply company's mains) when $Power_{UPS}$>EPP. Let it discharge and supply on its own to all devices 13, 14, 15. It is good for batteries and also saves the electricity bill. (b) Do a reassignment for devices until $Power_{UPS}$ comes back to the safe levels. (c) Reconnect the UPS 3 to its main input power when the UPS (batteries) has lost a predetermined amount of charge, for example 30% of its charge.

The device priority is more like a 'rank' for each and every smart device in the organization based on its importance for the enterprise's operations. However, the load on any device varies from time to time during time-of-day, day-of-week, week-of-month etc. As an example, an ERP server may need to process lot of data during nights or some particular days of week. In order to fully utilize the peak power limit at any time, we should try to allocate enough power to devices which need it irrespective of their operational priority. Second, in case of a contention for peak power, a higher ranked device will get power allocated first as was discussed above.

The IPM management server 5 in FIG. 1 collects a lot of information from each device periodically in a day. One of them is the power consumption by the device. Based on the historical data for previous days, weeks, months and years, statistical algorithms (e.g., linear prediction methods) can be run that can predict the peak power need for each device for the current day and it can be expressed at periodic intervals such as every hour or so.

Additionally, an administrator can make explicit peak power requirements for specific devices for any particular period of time. For example, every Monday between 3-6 pm some servers need to be operated at full capacity and hence need 100% peak power allocation.

Here is the overall approach to dynamic optimal peak power allocation.

1. Predict the peak power requirement for all devices at the beginning of day based on data collected. Let $Dload_j$ reflect this estimate for the device j and take a value in {1 to 11} as in Table 1 based on the percentage $100*(Dload_j/DPP_j)$
2. Allocate devices to appropriate $MINPP_j$ based on the estimate. This algorithm is similar to one explained above except that here we use the actual estimate $Dload_j$ instead of pre-assigned static priorities $DPrio_j$ for device j. For example, a device j which had lower $DPrio_j$ may actually be allocated higher peak power than the device k with a higher $DPrio_k$ during some part of the day since its $Dload_j$ is predicted to be higher. This is how all the sets $MINPP_i$ for i=1 to 11 get filled at the beginning of the day.
3. Now to reflect the real situation during day as time progresses, the devices that are operating within X % (e.g. 10%) of their allowed peak power in a 'Reassignment review interval' (as described earlier) can send a request to the IPM management program 11 to allocate them more power.
4. The IPM management program 11 collects all the requests and adaptively reallocates peak power to a subset of the requesting devices that, in order to satisfy the requests whenever possible.
5. This new increased allocation to the requesting devices may necessitate taking away excess allocation from a few other devices which are currently enjoying more peak power than the 'minimum peak power' (MINPP) they are entitled to.

Figure 6:
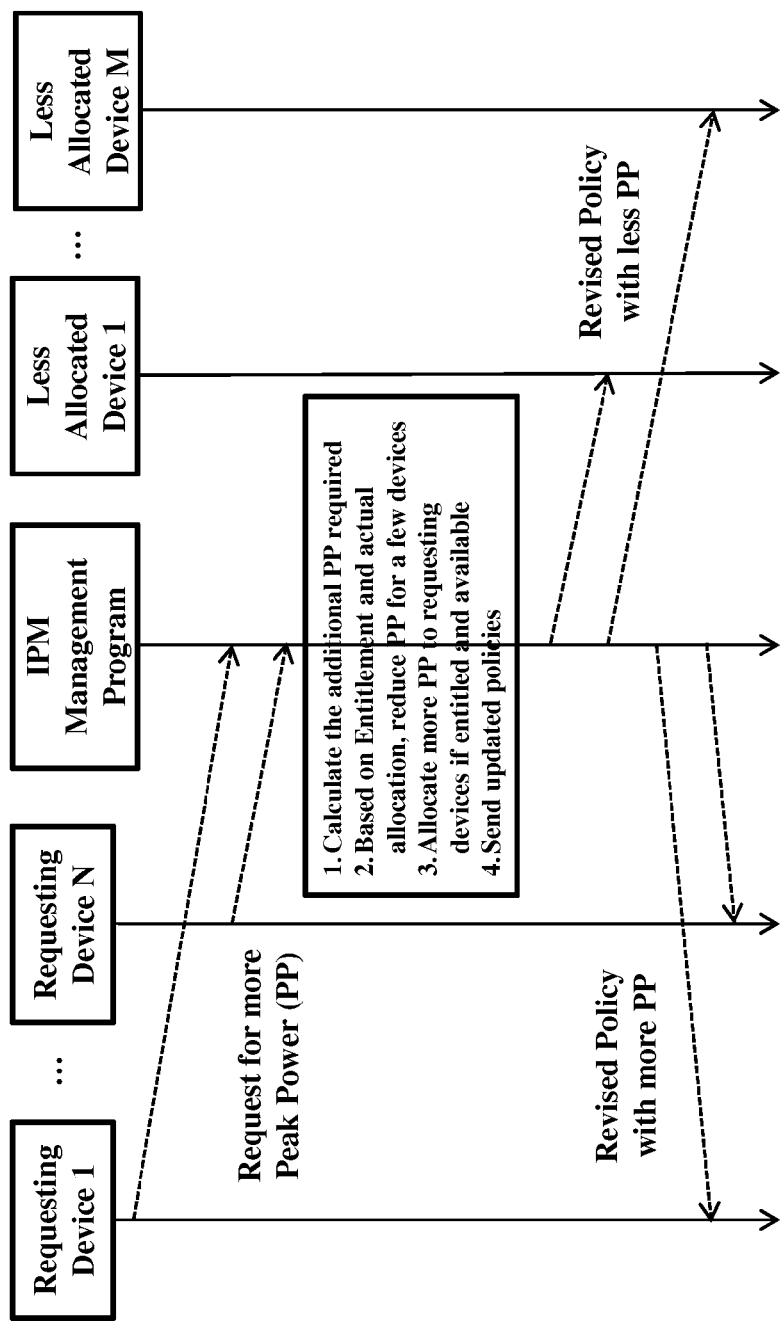
FIG. 6 illustrates a schematic diagram depicting the adaptive peak power reallocation according to an embodiment herein.

FIG. 6 illustrates a schematic diagram depicting the adaptive peak power reallocation according to an embodiment herein. Steps 4 and 5 above are explained in more detail below.

Figure 5:
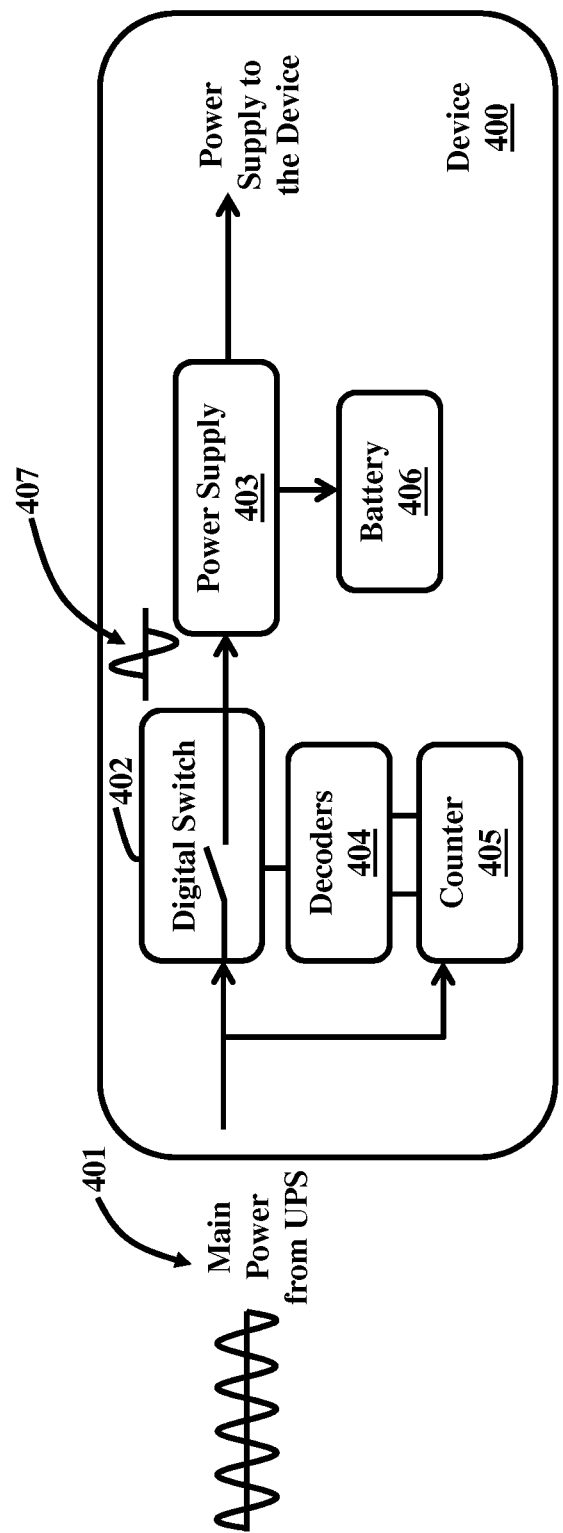
FIG. 5 illustrates a schematic diagram of a system for controlling the main power supply to a device's power supply according to an embodiment herein.

This process happens during every allocation review cycle. FIG. 5 shows requests coming from devices, computation done centrally by the IPM management program 11 and finally changed policy messages are sent to affected devices such as requesting devices and devices which will see a reduction in allocation.

Figure 7:
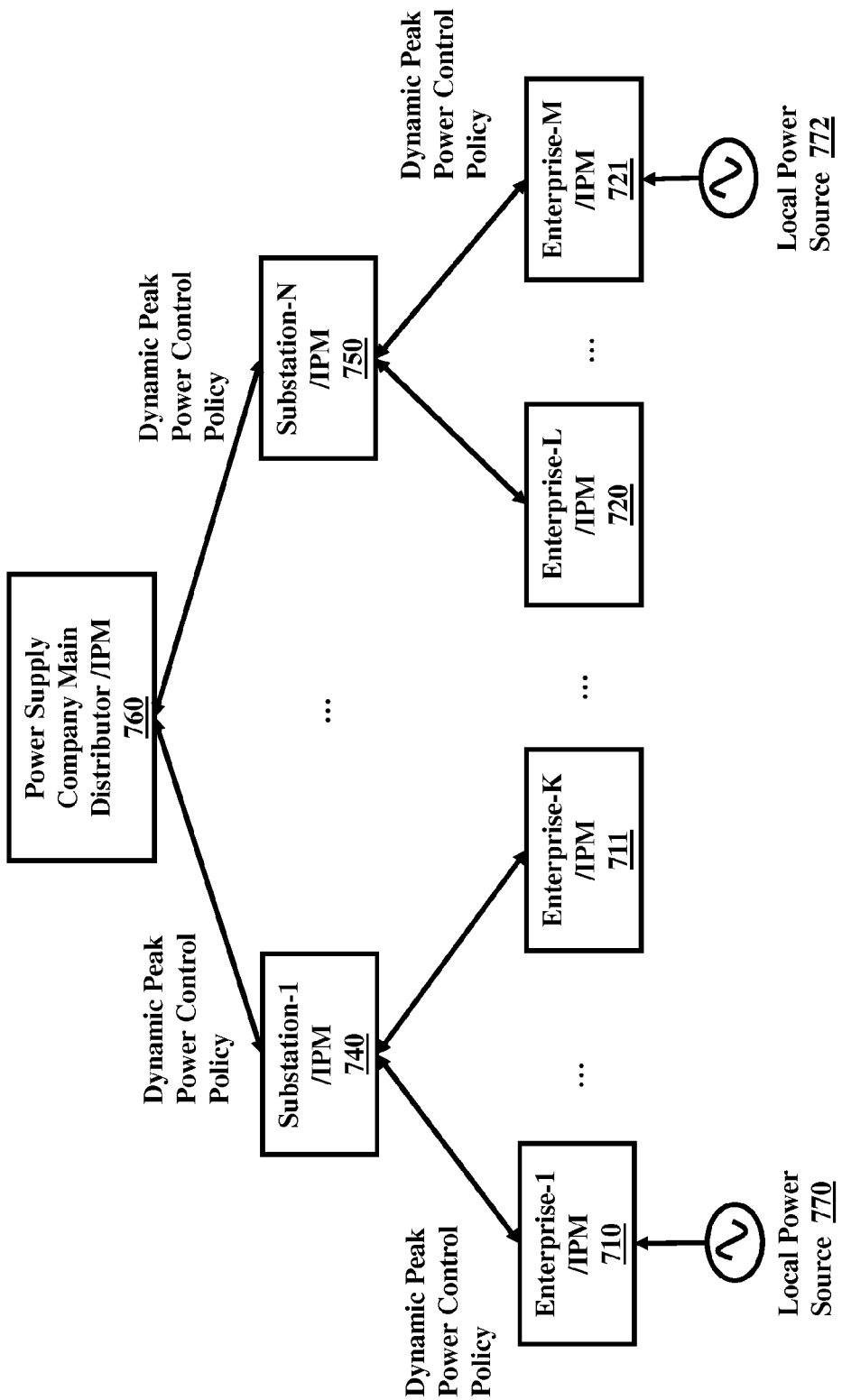
FIG. 7 illustrates a schematic diagram of peak power management in a hierarchical power distribution network according to an embodiment herein.

1. From all the requests, compute the required total hike in allocation of peak power HikePP. Let each requesting device $D_k$ be added to set $R_D$.
2. Calculate available headroom (m*EPP−$Power_{UPS}$) where m<1 since we cannot allocate all the currently applicable EPP. $Power_{UPS}$ is the power currently being consumed from UPS on its input side thus taking into account UPS losses.
3. DeallocPP=(HikePP−(m*EPP−$Power_{UPS}$)) is the peak power that needs to be deallocated or actually reduced from existing allocations to a subset of devices so that we can satisfy new requests. If DeallocPP is negative then there is no need to reduce peak power allocations for any device.
4. Determine the subset of devices $S_D$ as the set of all devices $D_i$ such that $D_i$'s current or running allocation > the minimum peak power it is entitled to (or $MINPP_i$) as per its pre-assigned operational priority $DPrio_i$. Let us call the current MINPP set number for $D_i$ as $CSN_i$. As an example, if a device $D_i$ has $DPrio_i$=7 then its minimum peak power allocation is 40% (or $MINPP_7$) as per Table 1. However if its current load is such that it is allocated 70% (or $MINPP_4$) of its peak power; i.e. $CSN_i$=4 then there is scope for bring its $CSN_i$=4 down from set 4 to 5 or 6 or 7.
5. Define the Excess-$alloc_i$ for device $D_i$ as ($CSN_i$−$MINPP_i$). For our example device it is (7−4)=3. Note that $DPP_i$ is the device's peak power demand as defined earlier.
6. For each device $D_i$ in $S_D$
    6.1. Excess-$alloc_i$ ($CSN_i$−$MINPP_i$)
    6.2. New-$CSN_i$=$CSN_i$+(Excess-$alloc_i$+1)/2  //in our example New-$CSN_i$=4+(3+1)/2=6
    6.3. Released-Peak-$Power_i$=$DPP_i$*(Peak Power Allocation for $CSN_i$−Peak Power Allocation for New-$CSN_i$)
7. Sort $S_D$ on Released-Peak-Power attribute of the devices
8. Set Avail-PP=0
9. For each device $D_i$ in $S_D$
    9.1. If (Avail-PP>=DeallocPP) then //released enough power
        9.1.1. New-$CSN_i$=$CSN_i$; // don't change the allocated MINPP set here-on else
        9.1.2. Avail-PP=Avail-PP+Released-Peak-$Power_i$
10. NeedHikePP=DeallocPP //needed Total additional Peak Power for requesting devices
11. For each request device $D_k$ in $R_D$ // for each requesting device
    11.1. Temp-$CSN_k$=$CSN_k$ //current set the device is allocated to
12. While (NeedHikePP_>0 AND Avail-PP>0 AND $R_D$ is not null)
    12.1. For each device $D_k$ in $R_D$ // for each requesting device
        12.1.1. Deficit-$alloc_k$=$MINPP_k$−Temp-$CSN_k$ //the deficit refer to difference between entitled MINPP set and current allocated set
        12.1.2. If (Deficit-$alloc_k$<=0) then Skip to next $D_k$ in $R_D$ // the current device needs no reallocation, so go to next requesting device (beginning of for loop)
        12.1.3. New-$CSN_k$=Temp-$CSN_k$ MIN((Deficit-$alloc_k$)/2, 1) // requesting device will move up by 1 at least
        12.1.4. If (New-$CSN_k$=Temp-$CSN_k$) then //if no change
            12.1.4.1. Skip to next $D_k$ in $R_D$ //Continue with the next requesting device;
        12.1.5. Used-peak-power=Peak Power Allocation for New-$CSN_k$−Peak Power Allocation for $CSN_k$ //use $DPP_k$ and MINPP percentages to calculate
        12.1.6. Avail-PP=Avail-PP−Used-peak-power
        12.1.7. NeedHikePP=NeedHikePP−Used-peak-power
        12.1.8. Temp-$CSN_k$=New-$CSN_k$
13. For each $D_i$ in $S_D$
    13.1. If (New-$CSN_k$ !=$CSN_k$) //allocation has changed for the excess PP device
        13.1.1. Send Peak Power Reallocation Message to $D_i$
14. For each $D_k$ in $R_D$
    14.1. If (New-$CSN_k$ !=$CSN_k$) //allocation has changed for the starved PP device
        14.1.1. Send Peak Power Reallocation Message to $D_k$ FIG. 7, with reference to FIGS. 1 through 6, illustrates how intelligent peak power management principles and implementation techniques which have been applied within an enterprise context, as described above, can be implemented all the way up to the main distribution point (MDP) of the power supply company. In this power distribution hierarchy the MDP 760 supplies power to the substations (SS) 740, 750, which in turn supply power to the enterprises 710, 711, 720, 721. It is assumed that all the elements in this network (MDP, SS) are intelligent and capable of dynamic peak power management, which has already been described above in detail in the context of enterprise and devices. Though FIG. 7 illustrates a 3-level hierarchy, the embodiments herein are not limited to such limitation on the depth of the hierarchy. Some of the enterprises or substations can have their own local power sources 770, 772 such as, for example, renewable energy sources based on solar power, wind power, and diesel generator, etc. Many a times the peak demand may be low enough in an enterprise such that the enterprise itself can actually feed power to the network. Thus, peak power management is called for at each level of this hierarchy using exactly the same policy based approach that has been explained above including the methods and processes described. However, the policy management will use a lot of historical, seasonal data in addition to real-time, actual situations in order to plan allocations to enterprises on a day-to-day basis. As far as a substation 740 is concerned an enterprise 710 is looked at as a logical device for peak power management. Similarly, a substation 740 is a logical device to the next higher level and so on.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can include both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
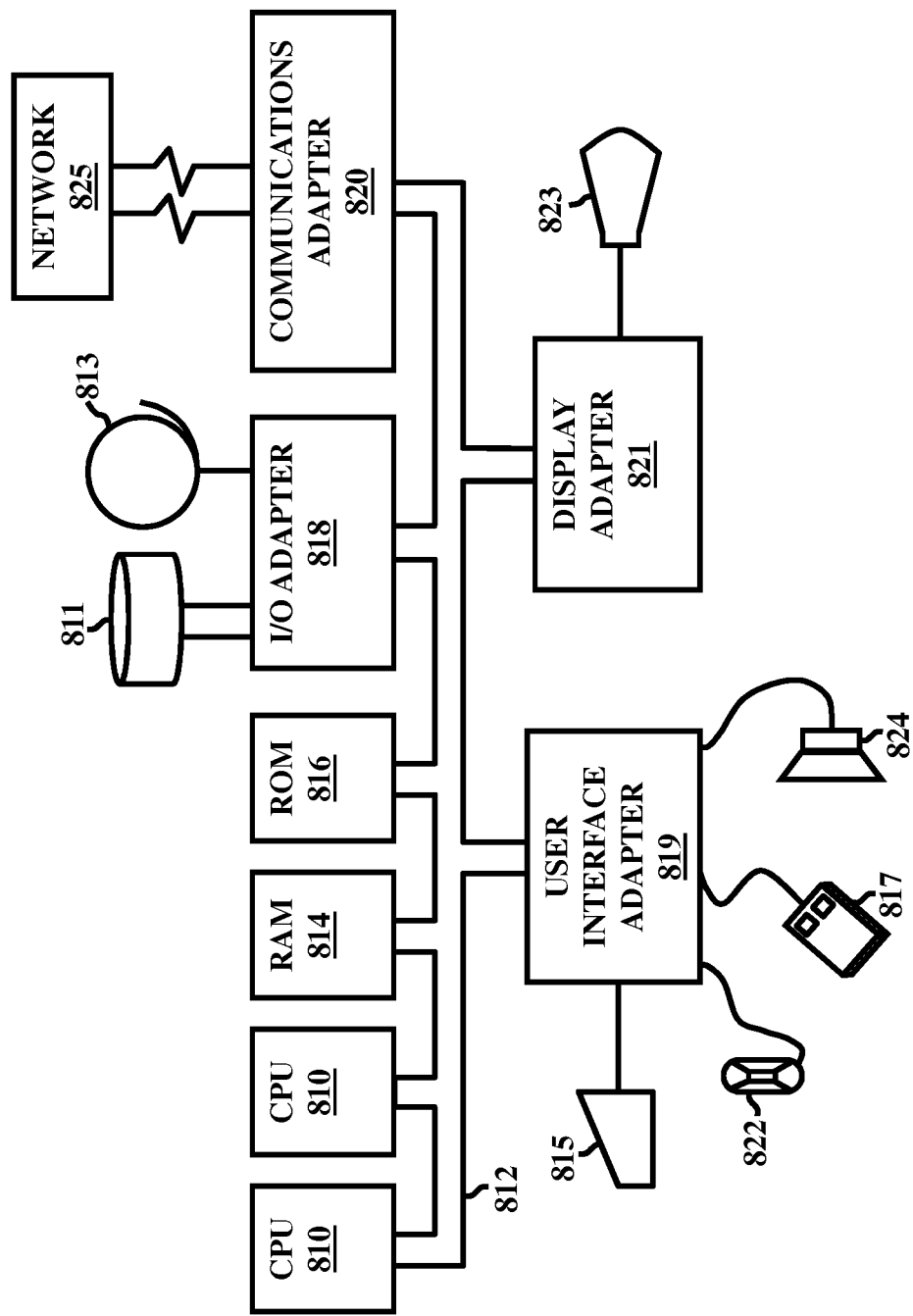
FIG. 8 illustrates a computer system according to an embodiment herein.

A representative hardware environment for practicing the embodiments herein is depicted in FIG. 8. This schematic drawing illustrates a hardware configuration of an information handling/computer system in accordance with the embodiments herein. The system comprises at least one processor or central processing unit (CPU) 810. The CPUs 810 are interconnected via system bus 812 to various devices such as a random access memory (RAM) 814, read-only memory (ROM) 816, and an input/output (I/O) adapter 818. The I/O adapter 818 can connect to peripheral devices, such as disk units 811 and tape drives 813, or other program storage devices that are readable by the system. The system can read the inventive instructions on the program storage devices and follow these instructions to execute the methodology of the embodiments herein. The system further includes a user interface adapter 819 that connects a keyboard 815, mouse 817, speaker 824, microphone 822, and/or other user interface devices such as a touch screen device (not shown) to the bus 812 to gather user input. Additionally, a communication adapter 820 connects the bus 812 to a data processing network 825, and a display adapter 821 connects the bus 812 to a display device 823 which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A peak power management system comprising:
at least one computing device comprising:
a central processing unit (CPU);
a main memory component accessed by said CPU;
a persistent storage connected to said memory component and accessed by said CPU;
a communication component for connecting to a communication network; and
an operating system controlling said at least one computing device and operated by said CPU;
a power management server comprising:
a cluster of computers running operating systems;
a set of virtual machines running on said cluster of computers;
one or more communication components for connecting to a communication network;
a persistent storage for storing any of software programs, applications, and data,
wherein said power management server runs a set of software applications comprising a power management program; and
said communication network that connects said power management server and said at least one computing device for exchanging messages between them,
wherein said peak power management system draws its electrical power for all said at least one computing device and said power management server from an uninterrupted power supply (UPS),
wherein said UPS draws power from any of an external power supply source and a captive electrical power generator,
wherein said external power supply source is configured to impose a temporal peak power profile (TPPP) comprising a time schedule based limits on an amount of peak power that can be drawn by an enterprise consumer under consideration during various time periods in a year,
wherein said data in the form of said TPPP is stored in said power management server persistently,
wherein said UPS comprises a built-in computing device and is configured to receive commands from said power management program and send responses to said power management program in addition to sending unsolicited messages to said power management program,
wherein each said at least one computing device runs a program comprising an intelligent power management agent all the time independent of whether the intelligent power management agent comprises a connected mode and disconnected mode respectively in order to communicate with said power management program,
wherein said power management program communicates with said intelligent power management agent on all said at least one computing device to send commands and receive responses or receive data from said intelligent power management agent in an unsolicited and time schedule based manner,
wherein said intelligent power management agent controls a peak power consumption based on an ability to control power consumption of said at least one computing device with minimal impact on a performance of said at least one computing device, and
wherein said intelligent power management agent continues to control power consumption of said at least one computing device, even when said intelligent power management agent is operating in the disconnected mode and is not communicating with said power management program in the connected mode.

2. The peak power management system of claim 1, wherein each said at least one computing device is assigned any of an operational priority, defined by a management user in power control policies, and a rank in the range of 1 to 10 indicating a level of importance for said at least one computing device with number 1 being a highest priority and number 10 being a lowest priority, and wherein a first computing device of higher priority is entitled to a higher peak power limit than a second computing device of lower priority, and wherein the peak power limit ranges from a percentage range of 100% to 0% of power drawn from said UPS.

3. The peak power management system of claim 2, wherein a peak power limit for a particular computing device comprises the percentage of a peak power demand that said particular computing device is configured to consume under unrestricted conditions, wherein all computing devices of a particular priority are entitled to a same peak power limit at any point of time.

4. The peak power management system of claim 3, further comprising a limited number of minimum peak power allowed (MINPP) data sets each corresponding to a peak power limit allowed by a percentage of a set of member computing devices, wherein a number of said MINPP data sets is equal to a number of operational priorities plus one.

5. The peak power management system of claim 4, wherein said particular computing device at any point of time is assigned to be in one of said MINPP data sets by said power management program, wherein an assignment to said MINPP data sets is configured to be changed by said power management program only, and wherein said assignment is restricted by said TPPP.

6. The peak power management system of claim 5, wherein said power management program in said power management server is configured to create a device peak power management policy (DPPP) for each said at least one computing device based on a priority of said at least one computing device, wherein said DPPP comprises an entitlement or allocation of said peak power limit for said at least one computing device at any particular point of time such that a total peak power allocated for all computing devices does not exceed the peak power limit imposed by said external power supply source as expressed in TPPP at any time.

7. The peak power management system of claim 6, further comprising at least one peak power assignment functions (PPAF) based on said TPPP and operational priorities of all said at least one computing device.

8. The peak power management system of claim 7, wherein said power management program in said power management server sends each DPPP to a corresponding computing device such that said intelligent power management agent running on said at least one computing device is configured to use said DPPP as a guide to control power consumption at any point of time even while said intelligent power management agent is operating in the disconnected mode.

9. The peak power management system of claim 8, further comprising an enhanced PPAF that further optimizes peak power allocation dynamically by:

determining, by said power management server, an actual number of computing devices that are on and are consuming power using power consumption data communicated to said power management server on communication paths between said power management server and said computing devices;

monitoring, by said power management program a peak power allocation to computing devices;

calculating, by said power management program, a peak power available as a difference between an allocated enterprise peak power (EPP) limit and actually used peak power as measured from said UPS at an end of each review period or cycle;

increasing, by said power management program, said peak power limit at every review cycle when said available peak power is >0, wherein said increase is for computing devices that are entitled for more allocation up from an actual current allocation for a given computing device, and wherein an increased allocation starts with least peak power allocated computing devices in a descending order of the operational priority of a selected computing device such that higher priority computing devices are allocated first among a set of least power allocated computing devices; and decreasing, by said power management program, said peak power limit for computing devices from said actual current allocation, when said available peak power is <0, such that more power is actually being consumed than the allowed EPP level at that time, then at every review cycle, wherein a decrease in allocation starts with least peak power allocated computing devices and among them in an ascending order of operational priority such that a decrease occurs from a lowest priority computing device to a highest priority computing device within said MINPP set of computing devices having a same current peak power allocation.

10. The peak power management system of claim 9, wherein said power management server and all controlled computing devices have their system clocks synchronized in time using a network time protocol (NTP) thereby ensuring that all computing devices will look at UPS power supply sinusoidal waves synchronously.

11. The peak power management system of claim 10, wherein in a one second interval, for a 50 Hertz frequency, a complete set of sinusoidal waves cycles are configured to be numbered from 1 to 50 and are seen in a same way by all computing devices at any time, wherein drawing external power supply from said UPS during all 50 cycles means 100% main peak power allocation and drawing power during only 5 contiguous cycles means 10% peak power allocation.

12. The peak power management system of claim 11, wherein an assignment of a set of contiguous sinusoidal cycles to any computing device is computed by said power management program based on said DPPP for that computing device and an overall boundary condition that said EPP is never exceeded at any time by a total allocation for all computing devices, wherein a random assignment of cycles to all computing devices is configured to achieve a statistically uniform distribution of power that is limited by said EPP over any given time schedule, and wherein the random assignment of cycles to computing devices is configured to avoid unexpected total peak power demand exceeding said EPP and is configured to make said total peak power demand flat during a time schedule during which said EPP is applicable.

13. The peak power management system of claim 12, wherein said DPPP comprises several time schedules with each schedule indicating a peak power allocated, a starting sinusoidal wave cycle number, and an ending cycle number for drawing external power from said UPS by a power supply unit of said particular computing device.

14. The peak power management system of claim 13, wherein said intelligent power management agent invokes programming calls with start and end cycle numbers as input parameters to a power supply programming interface at any of a beginning of each schedule and whenever a new DPPP is sent from said power management program on the server to said at least one computing device, wherein a power supply unit on said computing device connects to an external power source only during the cycles to said external power supply and is configured to store power or charge local batteries in order to supply an average power to all the internal device components, wherein selective connectivity is achieved by using a digital switching gate to said external power source which opens and closes based on contents of a digital counter, and wherein external power charges local batteries on said at least one computing device so that power is supplied continuously to said at least one computing device internally from said local batteries.

15. The peak power management system of claim 6, wherein said power management program collects all power consumption data from said at least one device through said intelligent power management agent and maintains a history database of such data persistently, wherein said peak power management system is configured to allow specific requests for power allocation during specific intervals of any day of a year for specific devices, wherein based on historical data and specific requests, said power management program is able to statistically predict required maximum peak power allocations for any of said at least one computing device for different time intervals of each day and accordingly assign said particular device to a corresponding set MINPP for each such interval.

16. The peak power management system of claim 15, wherein at a beginning of each day, DPPPs are created and sent to said at least one computing device, wherein said DPPPs are configured to be revised periodically during the day with a period equal to a reassignment review interval in order to adjust to real-time peak power demands coming from many devices, wherein said devices that are operating within a predetermined percentage of the allowed peak power in a review interval are configured to send a request to said power management program to allocate more power, and wherein said power management program collects all requests and adaptively reallocates peak power to a subset of requesting devices in order to satisfy the requests whenever feasible.

17. The peak power management system of claim 16, wherein an increased allocation to said requesting devices removes excess allocation from other devices which are utilizing additional peak power than a minimum peak power limit that they are entitled to.

18. The peak power management system of claim 1, wherein said at least one computing device comprises an information technology enabled device.

19. The peak power management system of claim 1, wherein said at least one computing device comprises a display device operatively connected to said CPU.

20. The peak power management system of claim 1, wherein said at least one computing device comprises a power backup storage battery used by said at least one computing device.

21. The peak power management system of claim 1, wherein said peak power management system is configured in a hierarchical power distribution network system comprising:
- at least one said peak power management system representing said enterprise consumer; and
- a hierarchy network of intelligent power distribution nodes belonging to a power supply company starting with a root level main distribution node,
- wherein said enterprise consumer is viewed as an intelligent device making variable peak power demand by its parent node,
- wherein each power distribution node is adapted to be dynamic policy driven, peak power management of its child-level nodes, and
- wherein each node makes best of use of its allocated peak power during any interval of time and allocates to its child-level nodes using peak power management methods.

* * * * *